US009161517B2

(12) United States Patent
Chamberlain

(10) Patent No.: US 9,161,517 B2
(45) Date of Patent: Oct. 20, 2015

(54) DOG WATERING TOY

(76) Inventor: Jeffrey Lynn Chamberlain, St. Louis, MO (US)

(*) Notice: Subject to any disclaimer, the term of this patent is extended or adjusted under 35 U.S.C. 154(b) by 2563 days.

(21) Appl. No.: 10/788,637

(22) Filed: Feb. 27, 2004

(65) Prior Publication Data

US 2011/0094450 A1    Apr. 28, 2011

Related U.S. Application Data

(62) Division of application No. 09/922,376, filed on Aug. 3, 2001, now abandoned.

(60) Provisional application No. 60/222,974, filed on Aug. 4, 2000.

(51) Int. Cl.
*A01K 29/00*    (2006.01)
*A01K 11/00*    (2006.01)
*A01K 7/00*    (2006.01)

(52) U.S. Cl.
CPC .............. *A01K 15/026* (2013.01); *A01K 7/00* (2013.01)

(58) Field of Classification Search
CPC ... A01K 15/02; A01K 15/025; A01K 15/026; A01K 7/00
USPC ............................ 119/702, 707, 709, 710, 72
See application file for complete search history.

(56) References Cited

U.S. PATENT DOCUMENTS

| 5,495,870 | A | * | 3/1996 | Dorta | 137/588 |
| 5,619,954 | A | * | 4/1997 | Rotondi | 119/707 |
| 5,857,431 | A | * | 1/1999 | Peterson | 119/710 |
| 5,944,516 | A | * | 8/1999 | Deshaies | 433/1 |
| 5,961,406 | A | * | 10/1999 | Hass | 473/576 |
| 5,965,182 | A | * | 10/1999 | Lindgren | 426/104 |
| 6,092,489 | A | * | 7/2000 | Huettner et al. | 119/707 |
| 6,109,998 | A | * | 8/2000 | DiResta et al. | 446/184 |
| 6,405,681 | B1 | * | 6/2002 | Ward | 119/707 |

FOREIGN PATENT DOCUMENTS

| CH | 700289 A2 | * | 7/2010 | | |
| EP | 0780316 A1 | * | 6/1997 | ............ | B65D 47/12 |

* cited by examiner

*Primary Examiner* — Joshua Huson
(74) *Attorney, Agent, or Firm* — Charles R. Sutton

(57) ABSTRACT

A convenient, inexpensive, durable, refillable, specialized dog toy which can be made of various materials and have various aesthetic designs. The toy is a self-contained water source, or reservoir, for use where a messy dog bowl would be inappropriate. As the dog bites down upon the toy, in a particular location; water seeps out through tiny valves. The outside of the toy may be a superficial art form, perhaps including but not limited to, imitation bones, steaks, or burgers. The outside may be composed of rubber, plastic, vinyl, latex, or a cloth, denim or furry exterior. The toy may even be made of wood or substances which are edible to a dog. A fill cap is provided by which water can be added to the reservoir. A carrying cord may be provided on the outside by which the toy can be carried by dog or human without compressing out any of the water.

11 Claims, 5 Drawing Sheets

DOG WATERING TOY

CROSS-REFERENCES TO RELATED APPLICATIONS

This application is a divisional application of application Ser. No. 09/922,376 being examined in art unit 3644 which was filed on Aug. 3, 2001 now abandoned. Applicant claims the benefit of the filing date of application Ser. No. 09/922,376 pursuant to 35 U.S.C. 120. application Ser. No. 09/922,376 in turn claims the benefit of the Aug. 4, 2000 filing date of Provisional Patent Application No. 60/222,974 and applicant claims the benefit of this earlier filing date as well.

STATEMENT AS TO RIGHTS TO INVENTIONS MADE UNDER FEDERALLY-SPONSORED RESEARCH AND DEVELOPMENT

This invention was not made under federally sponsored research and development.

Applicant retains all rights.

BACKGROUND OF THE INVENTION

1. Field of the Invention

This invention falls within the field of dog toys which can be chewed or manipulated with the jaws. It also falls within the field of mechanisms by which a controlled supply of water can be provided to a pet.

2. Description of Related Art Including Information Disclosed Under 37 CFR Sections 1.97 and 1.98

Chewable dog toys are known to the art. They are often a plastic or rubber article made to resemble a steak, burger or bone which is suitably sized so that the dog can chew on the toy comfortably. They may also be composed of a substance which is edible to the dog, such as rawhide. At times a noisemaker is provided, such as a bell inside. Dog toys are known which are hollow and provided with an air escape passage that has a reed type noise maker. Such a toy will make a noise as it is chewed.

Over the years, the Pet Industry has introduced and developed a wide assortment of products designed to provide a watering source for thirsty canines. Even so, all of these products have been either in the "bowl type" and/or "hose type" categories. The bowl type devices can hold a lot of water, but are not portable when full and tend to make a mess if they are spilled and/or sloshed by a playful canine. The hose type are good for outdoor use, but require a continuous water flow regardless of canine use which can lead to expensive and troublesome water build-up for the property owner. Neither watering source is suited for adventurous play away from populated areas and while the dog is being transported.

SUMMARY OF THE INVENTION

This invention is an improvement over the prior art which allows the above described chewable dog toys to be filled with water. The invention may also take the form of a chewable water dispenser which has no external ornamentation. As the dog chews the toy, the toy emits a measured amount of water from valves on its surface which the dog can drink. The toys have a closable refill aperture, an internal reservoir, the aforementioned valves and possibly a surface which maybe molded to resemble the typical aesthetic designs of dog chew toys already known. The toys may be composed of materials which are edible to dogs. In any event, they are composed of a resilient chewable substance that is non-toxic and yielding, so that the toy will not damage furniture if the dog tosses it around in play.

DESCRIPTION OF THE PREFERRED EMBODIMENT

Figure 1:
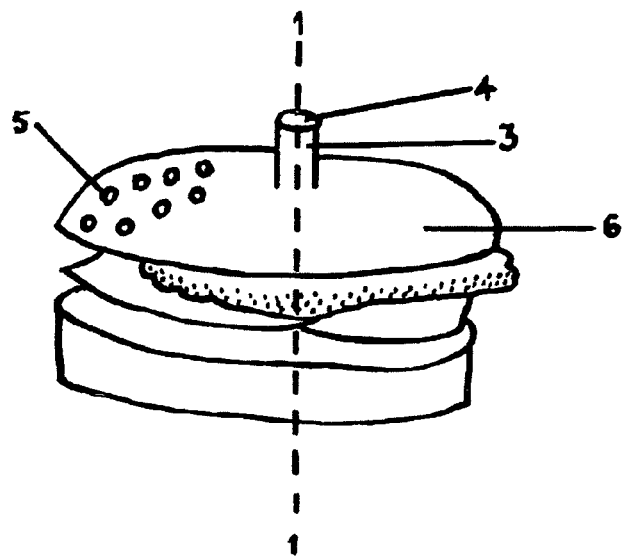
FIG. 1 is a sectional view of a hamburger-shaped embodiment of the invention.

This invention confines and distributes water for use by pets in general, but most particularly for dogs (who characteristically exhibit chewing behavior). When pets are being transported or are in a remote location, providing water by a bowl type or hose type watering means is not practical. It is also not fun. It is an object of this invention to provide a fun and practical means of providing water on the go to pets such as dogs. FIG. 1 is a cross-sectional view where the section is taken across a plane (1). The Referring now to FIG. 1, the invention consists of a puncture resistant reservoir (2) which can hold water. The reservoir has a fill aperture (3) through which water can be introduced. A cap (4) is provided by which the fill aperture can be closed, thereby retaining the water inside the reservoir. Possible fastening techniques for this cap would be to have a threaded screw cap or a pop top style cap. Other closure techniques can be used without departing from the spirit of this invention as long as the cap does not allow water to escape once the cap is closed. Valves (5) are present by which water can be extruded from the reservoir in measured amounts in response to pressure placed on the reservoir, such as would happen during chewing.

Figure 2:
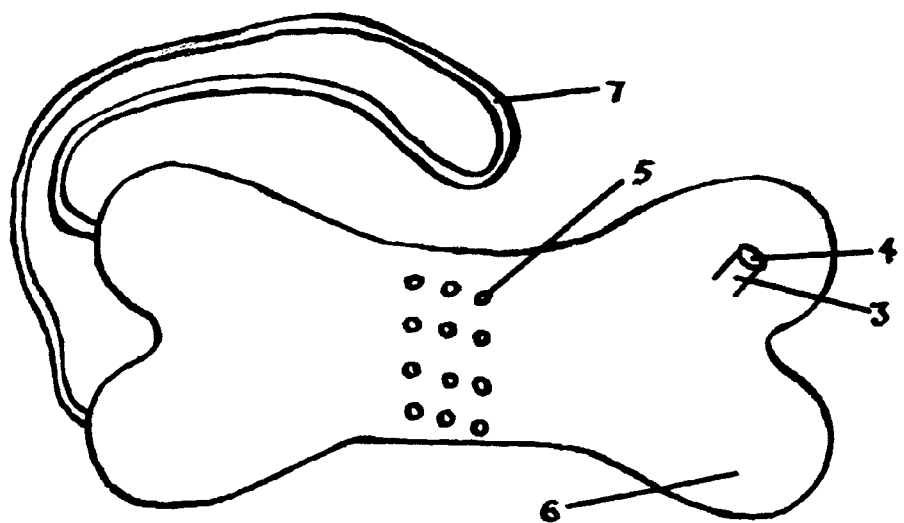
FIG. 2 shows a bone shaped embodiment of the invention with cord attached.
Figure 3:
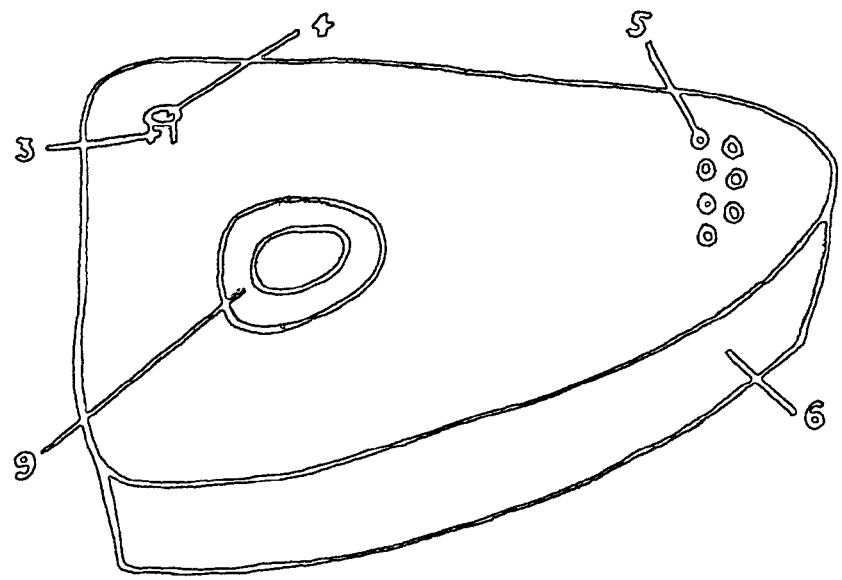
FIG. 3 shows a steak shaped embodiment of the invention bearing indicia simulating bone.
Figure 4:
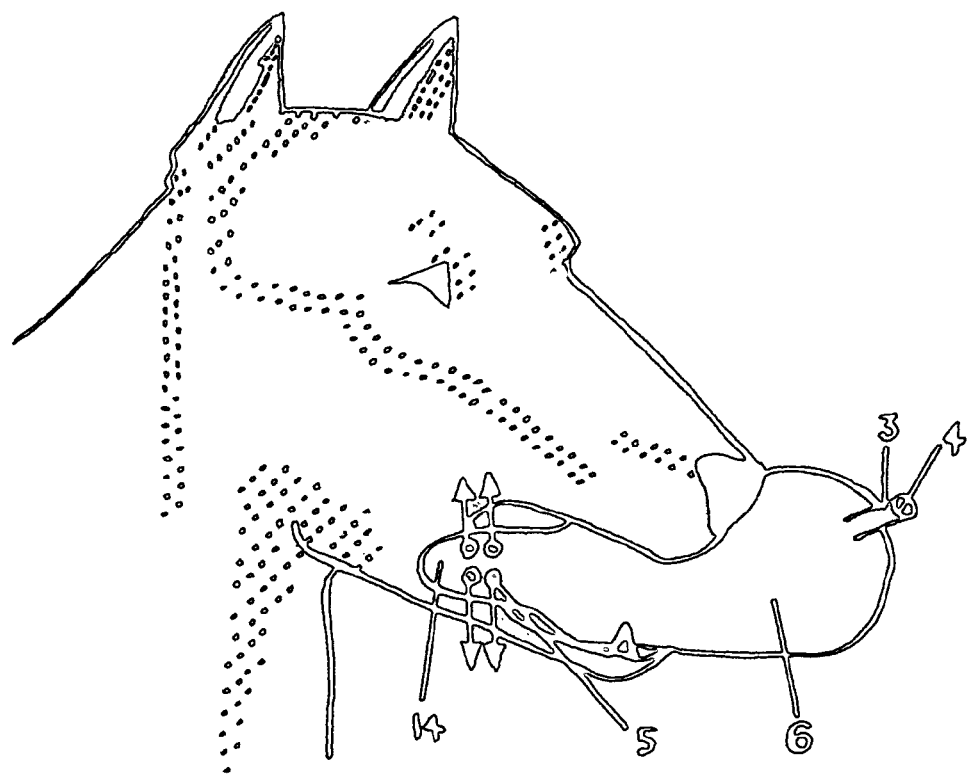
FIG. 4 shows the invention in an embodiment including the valves on a nipple like structure.

Alternatively suction from the outside can be used to cause water to flow through the valves. An outer layer (6) may be formed onto the outside of the reservoir of a resilient non-toxic substance. The outer layer may be molded and colored so that it has an aesthetic appearance that would be appropriate to a chew toy. While FIG. 1 shows a toy that is shaped to resemble a hamburger, FIG. 2 shows a toy that is shaped to resemble a bone. A carrying cord (7) may be added for convenience in carrying the dog watering toy. FIG. 3 shows a dog watering toy that is shaped to resemble a steak. Indicia (9) can be painted on the outside or created by colors molded into the toy. These indicia may be for the purpose of furthering the design objectives of creating an aesthetic appearance for the dog watering toy. The outer layer can be, but is not necessarily, composed of latex, vinyl, rubber, cloth, denim, or furry substances. The valves would open outside the outer layer if an outer layer is present. The fill aperture would open outside the outer layer if an outer layer is present. When no pressure is placed on the reservoir, the valves will retain the water inside the reservoir. The valves can take the form of form fitting grooves which are sprung open by chewing pressure, one-way valves which the teeth push into and out of the reservoir, or even a nipple-like structure (14) for sucking such as that seen at FIG. 4. This latter means would be useful for a dog with missing teeth or for a pet that has sucking behavior but not necessarily chewing behavior, such as a potbellied pig, for instance. The reservoir would be composed of an inexpensive, resilient and durable substance which is soft enough so that it will not damage furniture if the toy is tossed about. Among the possible forms of reservoir would be a plastic reservoir or a flexible metallic bag reservoir. If there is no outer layer, the surface of the reservoir must not be toxic to pets. It should not be toxic to pets even if an outer layer is present. The outer layer would be composed of an inexpensive, resilient and durable substance which is soft enough so that it will not damage furniture if the toy is tossed about. The outer layer of a dog watering toy designed for outdoor use would be more durable than the outer layer of a dog watering toy designed for indoor use, as a general rule. The outer layer, valves, cap, fill aperture, and reservoir could all be made of substances which are edible for dogs, such as rawhide. They could also be made of biodegradable, expendable, indigestible substances such as wood so that the dog could eventually chew the toy away to nothingness.

The reservoir could range from less than 8 ounces volume to more than 24 ounces volume to accommodate various thirst requirements. The valves where the dog extracts water are designed so that droplets of water are exuded rather than streams of water. This is so that there is no mess and the reservoir will retain water for a longer time. Two hours of water availability is a desirable objective in designing valve flow rate and reservoir capacity, as a typical outing with the dog can be had without the need of refilling the reservoir. A cord (7) may be provided by which the pet or a human may carry the dog watering toy around without exerting any pressure on the reservoir.

Figure 5:
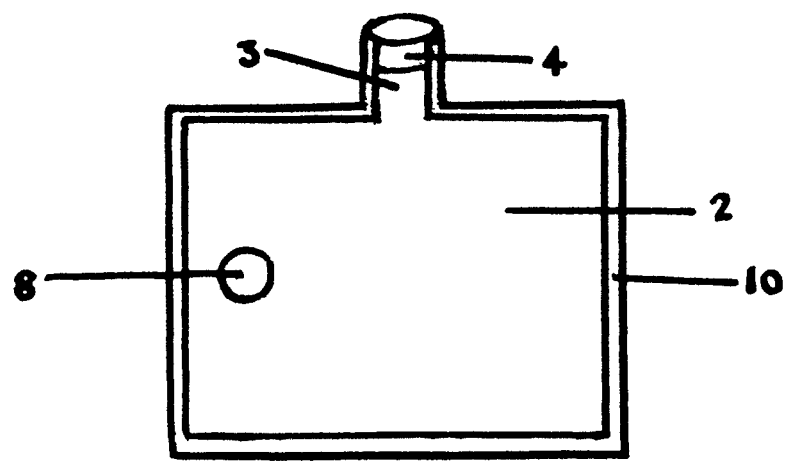
FIG. 5 shows a sectional view of the invention without an outer layer and with a noisemaker inside.
Figure 6:
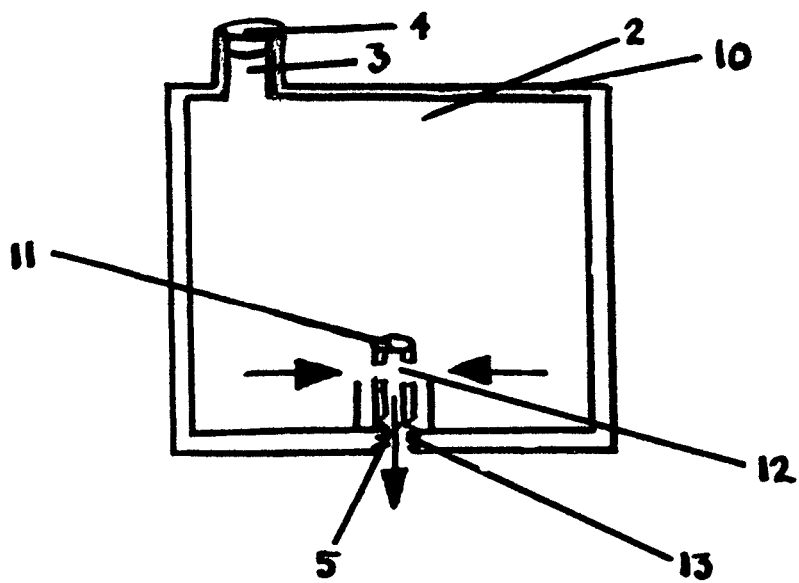
FIG. 6 shows a sectional view of the invention with plunger type valve and arrows depicting water flow direction.
Figure 7:
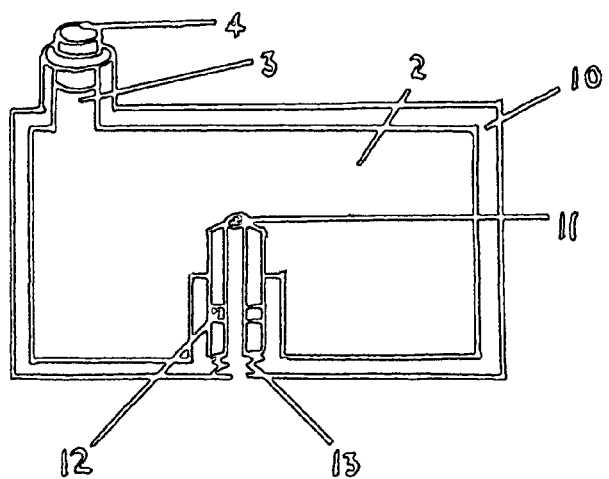
FIG. 7 shows a sectional view of the invention with plunger type valve in closed position.

Referring now to FIG. 5, an additional feature could be to add a noisemaker (8) such as a bell or rattle beads to the invention by placing them inside the reservoir where they will make noise when the reservoir is substantially empty. This could alert dog and owner alike that there is no more water in the toy. The reservoir would have its own wall (10) which may be but is not necessarily a unitary piece with the outer layer. Referring now to FIG. 6, the valve (5) is shown in an embodiment by which the dog's tooth pressure physically moves a valve mechanism (11) into the reservoir (2). The valve mechanism has one or more openings (12) which communicate with the outside of the toy when the valve mechanism is pushed into (or out of) the reservoir. Water can then exit the toy in the direction indicated by the arrows in FIG. 6. Return means (13) are provided to ensure that the valve mechanism will return to its closed resting position once chewing pressure is released. FIG. 7 shows the toy in the closed resting position. The return means (13) have pulled the valve mechanism (11) down to a position where the openings (12) are blocked from communicating with the reservoir (2) by the wall (10).

Figure 8:
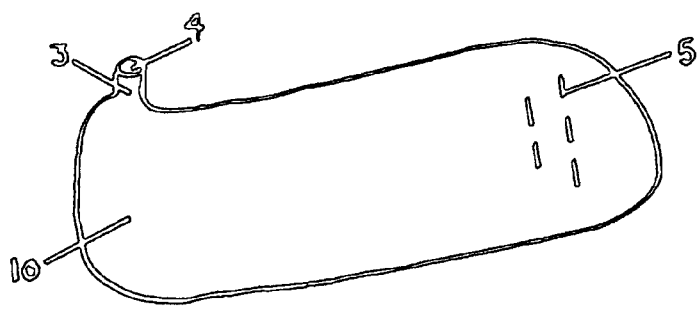
FIG. 8 shows the invention in an embodiment featuring slit type valves that are closed.
Figure 9:
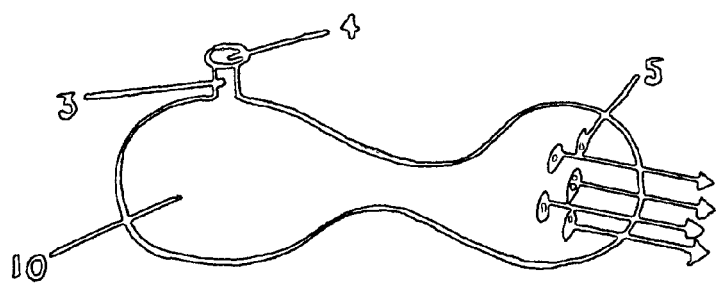
FIG. 9 shows the invention in an embodiment featuring slit type valves while the invention is compressed which opens the slits.
Figure 10:
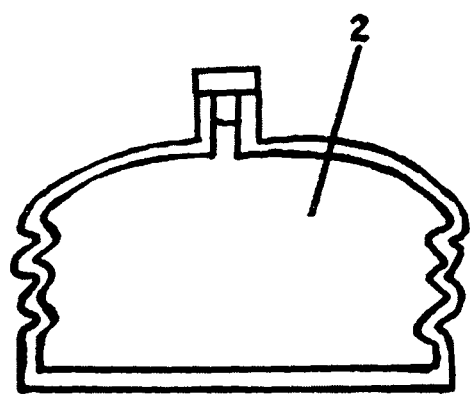
FIG. 10 is a sectional view of the invention with the section taken along the line 1-1 of FIG. 1.

At FIG. 8 is a valve embodiment in which the valves (5) take the form of slits in the wall of the reservoir. At FIG. 9 the embodiment of FIG. 8 is shown as it would appear when the wall of the reservoir is compressed, such as by chewing. The pressure on the wall as well as the pressure on the water inside causes the valves (5) to be deformed into lenticular apertures through which the water flows in the direction shown by the arrows. FIG. 10 is a sectional view of the invention with the section taken along the line 1-1 of FIG. 1. The description above discloses several embodiments but not all possible embodiments of the invention. Equivalent mechanisms may be substituted for some or all the elements without departing from the spirit of the invention. The above description is not meant to limit the scope of the claims.

I claim:

1. An apparatus to alleviate pet thirst comprising:
an edible reservoir having a wall, said wall having an edible fill aperture and edible valves; said edible fill aperture having an edible cap, said edible cap when open allowing liquid to enter said edible reservoir through said edible fill aperture, said edible cap when closed denying egress from said edible reservoir; said edible valves having pressure actuated opening means, said edible valves under pressure allowing liquid to exit said edible reservoir, said edible valves when not under pressure denying egress from said edible reservoir.

2. The apparatus of claim 1 further comprising an edible outer layer enclosing said wall, said edible outer layer having an aesthetic design.

3. The apparatus of claim 2 further comprising indicia on said edible outer layer.

4. The apparatus of claim 1 further comprising a cord attached to said apparatus.

5. The apparatus of claim 1 further comprising a noisemaker contained within said edible reservoir.

6. A pet care apparatus comprising a biodegradable reservoir having a wall, a fill aperture, and valves; said wall being adapted to hold liquid and being compressible; said fill aperture having an airtight openable biodegradable cap; said biodegradable cap when open permitting liquid to be introduced to said biodegradable reservoir through said fill aperture; said valves being slits deformable by pressure; whereby creating a net greater pressure inside said biodegradable reservoir when said biodegradable reservoir contains liquid and when said biodegradable cap is airtight will cause said liquid to exit said valves.

7. The pet care apparatus of claim 6 further comprising an edible outer layer attached to said wall, said edible outer layer having an aesthetic design.

8. The pet care apparatus of claim 7 wherein said edible outer layer bears indicia.

9. The pet care apparatus of claim 6 further comprising a cord attached to said pet care apparatus.

10. the pet care apparatus of claim 6 wherein said biodegradable reservoir is edible.

11. The pet care apparatus of claim 6 further comprising a noisemaker inside said biodegradable reservoir and said biodegradable reservoir has biodegradable valves.

* * * * *